J. J. SHEA, Jr.
FREIGHT HANDLING APPARATUS.
APPLICATION FILED FEB. 4, 1920.
1,402,257.
Patented Jan. 3, 1922.
2 SHEETS—SHEET 2.
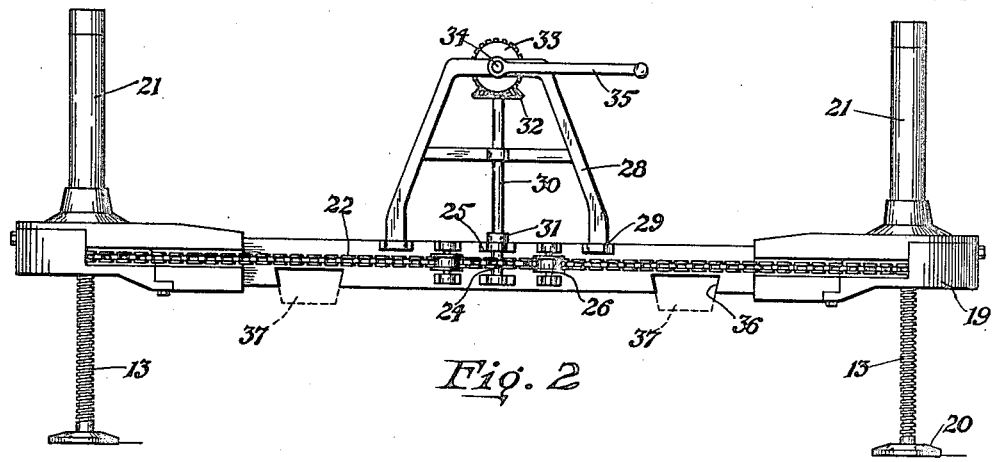
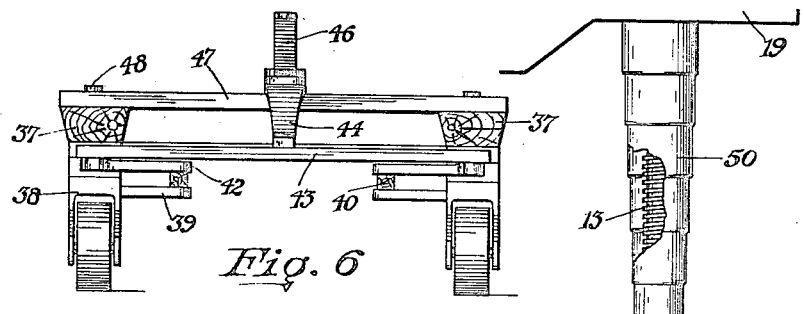
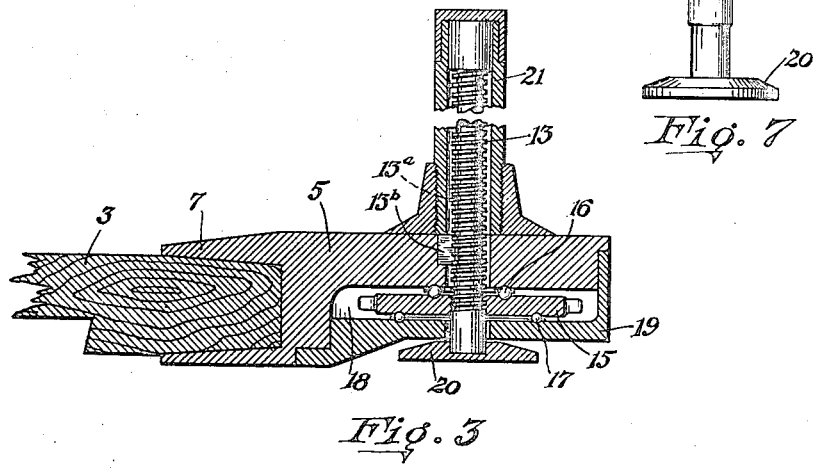
INVENTOR
J. J. Shea, Jr.
BY
Dull, Warfield & Dull
ATTORNEY

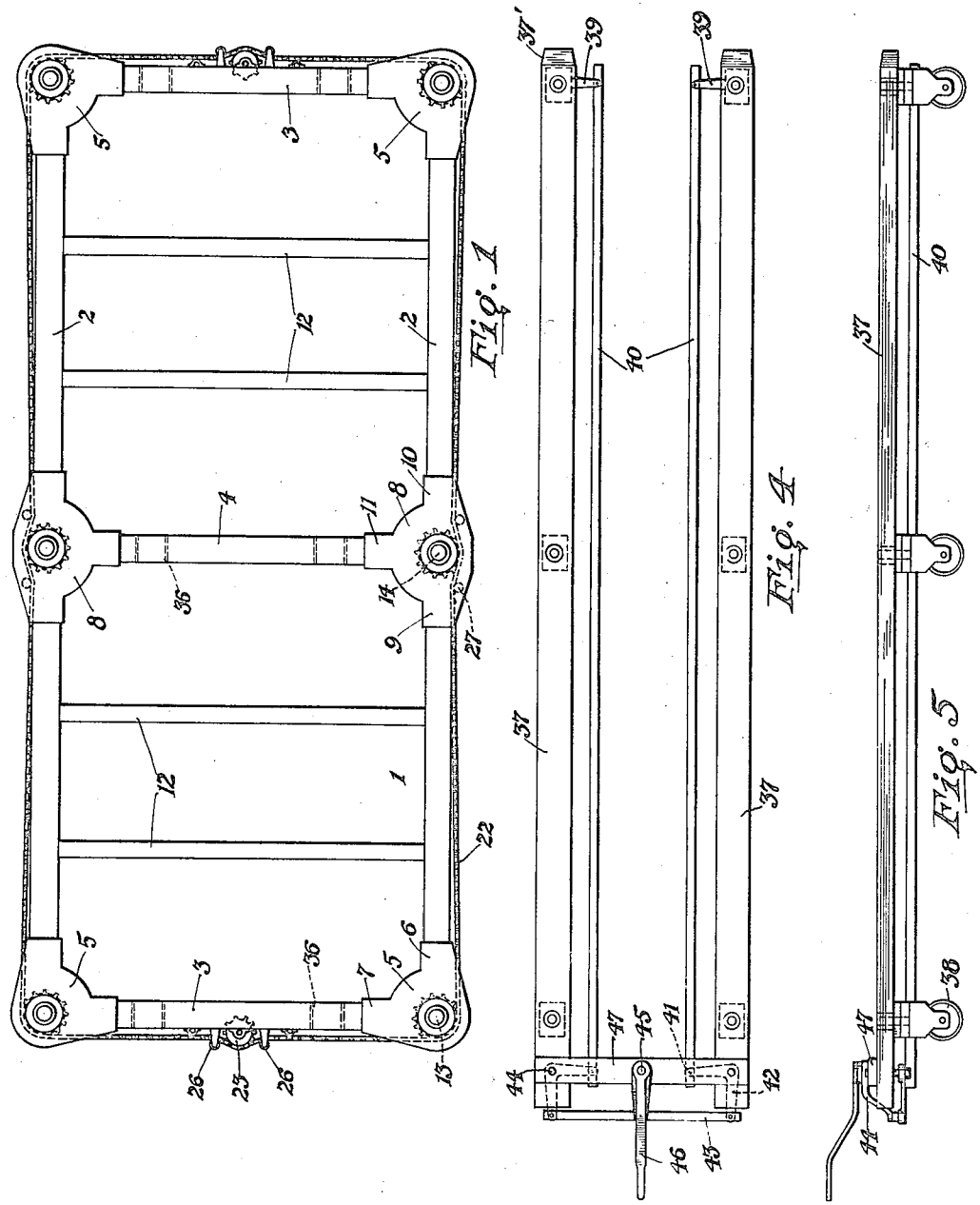

UNITED STATES PATENT OFFICE.

JOHN J. SHEA, JR., OF ELMHURST, NEW YORK.

FREIGHT-HANDLING APPARATUS.

1,402,257.

Specification of Letters Patent.   Patented Jan. 3, 1922.

Application filed February 4, 1920. Serial No. 356,218.

*To all whom it may concern:*

Be it known that I, JOHN J. SHEA, Jr., a citizen of the United States, residing at Elmhurst, in the county of Queens and State of New York, have invented certain new and useful Improvements in Freight-Handling Apparatus, of which the following is a full, clear, and exact description, such as will enable others skilled in the art to which it appertains to make and use the same.

This invention relates to freight handling apparatus, and with respect to some of its more specific details to a freight-receiving unit and a carrying unit or truck therefor.

One of the objects of this invention is to provide a simple and improved freight handling apparatus embodying superiority in construction and possessing distinct functional advantages.

Another object is to provide an improved apparatus of the character mentioned for effecting savings in time and labor in handling all kinds of merchandise.

Another object is to provide an improved apparatus for handling merchandise whereby breakage or damage to the goods is avoided.

It is a further object to provide an improved freight-receiving unit of convenient form to be readily moved by a cooperative detachable truck or carrying unit, and also to act as a container or carrier to be stored with its contents or to be placed for transportation in cars, ships, barges, or the like.

It is a further object to provide a freight-receiving unit having improved and readily detachable means whereby the unit may be easily raised and lowered either when loaded or when light, and which is light, strong and comparatively cheap to make.

It is a further object of this invention to provide a knock-down truck or carrying unit of simple construction which is provided with means for ready attachment in carrying relationship to a freight-receiving unit and which also has simple and efficient detachable steering mechanism.

Other objects will be in part obvious and in part pointed out hereinafter.

In the accompanying drawings forming a part of this specification and wherein an illustrative embodiment is shown,—

Figure 1 is a top plan view of a freight-receiving unit;

Fig. 2 is an end elevation thereof showing the same in elevated position;

Fig. 3 is a detail enlarged sectional view through a corner of the freight-receiving unit showing details of the raising and lowering mechanism;

Fig. 4 is a plan view of the truck or carrying element;

Fig. 5 is a side elevation, and Fig. 6 an end elevation of the truck, and

Fig. 7 is a detail view of a modification.

Referring now to the drawings for a more detailed description of the invention, the freight-receiving unit may assume many different forms in practice, an illustrative embodiment being shown in Figs. 1, 2 and 3 and designated generally by the reference numeral 1. The illustrative embodiment comprises a frame having longitudinal side sills 2, transverse end sills 3 and an intermediate transverse sill 4. Disposed at each corner of the frame is a casting or timber pocket 5 having angularly disposed projections 6 and 7 providing pockets for receiving the respective ends of the side and end sills for securing the same securely in assembled relationship. As shown, the side sills may be divided near their center of length, and intermediate the ends of the frame are castings or timber pockets 8 having pocket projections 9 and 10 in alignment with the side sills and receiving the adjacent ends of the latter. These timber pockets 8 also having angularly disposed pocket projections 11 extending inwardly and being adapted to receive the adjacent ends of the intermediate transverse sill 4.

In order to raise and lower the freight-receiving unit for purposes more fully described hereinafter, manual operating means are provided for this purpose as shown in Figs. 1, 2 and 3. Suitably threaded lifting rods 13 are preferably mounted in vertical position in the corner castings 5 and similar lifting rods 14 are mounted in the intermediate castings 8. These rods extend through vertical openings in the respective castings and each is provided with an internally threaded sprocket nut 15 adapted to screw on the respective threaded rod. This sprocket may be suitably mounted in the castings on ball bearings as shown at 16, 17, but it is obvious that any suitable form of anti-friction bearings may be substituted for the ball bearings shown. Each sprocket nut is positioned in a horizontal aperture 18 in its supporting casting and the lower bearings 17 therefor are supported by a readily removable plate 19 which is suitably secured to the casting by machine screws or any similar securing means. Each screw rod is provided with a longitudinal slot 13ˣ terminating short of the ends thereof as shown in Fig. 3, and a key 13ᵇ seated in an opening in the casting, projects into said slot to limit longitudinal movement and prevent rotary movement of the rod. Suitably secured to the lower end of each rod 13 or 14 are supporting feet 20 adapted to engage the supporting surface upon which the unit rests. For protecting the upper ends of the threaded rods, tubular housing members 21 are secured to the castings. The threaded rods are adapted to move in telescopic relationship with the housing members when operated to raise or lower the frame. These tubular members may also act as stakes for retaining the lading in position on the freight-receiving unit.

In order to operate all of the sprocket nuts in unison manual operating means are provided. In the illustrative embodiment shown, this means includes an endless sprocket chain 22 passing entirely around the frame of the freight-receiving unit and engaging the teeth of each of the sprocket nuts. The sprocket shown may be manually driven through driving sprockets 23 mounted on stub shafts 24 supported in suitable bearings 25 at opposite ends of the frame. Guiding and supporting rollers 26, or similar means, are mounted adjacent the driving sprockets 23 for supporting the sprocket chain and guiding the same in engagement with the driving sprocket. Similar guiding and supporting means 27 for the sprocket chain may be provided at the sides of the frame, and it is obvious that additional supporting and guiding means may be employed if found desirable.

In order to operate the driving sprockets 24, a manually operable gear is provided, and as shown in the drawing, this operating gear may comprise a suitable frame 28 which is detachably supported in position at the end of the unit, as by stake pockets 29 mounted on the end sills. Suitably mounted in this detachable frame is a vertical shaft 30 having at its lower end a socket 31 provided with a non-circular aperture for cooperating with a similarly shaped portion at the upper end of the stub shaft 24. The upper end of shaft 30 carries a bevel gear 32, which is in mesh with a similar bevel gear 33 mounted upon a horizontally disposed shaft 34, having secured at the outer end thereof a suitable crank 35. This operating gear is easily detachable and may be removed from the freight-receiving unit after the operation of raising or lowering the same has been performed.

On the under surfaces of the end sills 3 and the transverse sill 4 dovetailed channels 36 disposed longitudinally of the frame are formed to receive longitudinal engaging members of the carrying truck, as will be more fully described hereinafter.

As shown in Figs. 4, 5 and 6 the truck or carrying unit comprises a frame supported by three pairs of wheels or casters and is provided with steering mechanism for steering the truck. The truck frame may assume many different forms in practice and is more or less diagrammatically shown in the illustrative embodiment in the drawing. As shown, this frame has longitudinally extending frame members 37 which are dovetailed or trapezoidal in cross section to cooperate with the dovetail grooves 36 mentioned above. Wheels or casters 38 are mounted in spaced relationship on each longitudinal frame member or slide 37 and each caster adjacent one end of the frame has attached thereto an inwardly extending arm 39 which is pivotally secured to a longitudinally extending steering rod 40, as clearly shown in Fig. 4 of the drawing. One of these steering rods 40 is arranged at each side of the truck frame and the forward end of each is pivotally connected, as at 41, to an inwardly extending arm of a bell crank lever 42 mounted on the frame of the truck. The other arm of each bell crank lever is pivotally connected to a transversely extending steering bar 43 intermediate the ends of which is connected a steering crank 44. The steering crank 44 is mounted on a vertical shaft 45 and is operable through the connections described to move the casters to steer the truck. The shaft 45 is detachably mounted in a transverse frame member 47 and is provided at its upper end with a handle 46 for manually operating the steering gear. Frame member 47 extends between the longitudinal frame members 37 and is detachably secured thereto by stub bolts 48 extending upwardly from the frame member 37. The connections between the bell crank levers and the transverse steering rod 43 are easily detachable and the steering shaft 45 is detachably mounted in the transvese frame member 47 so that the steering shaft and rod may be easily detached from the frame or placed in operative position thereon as desired. The transverse frame member may also be readily detached from the longitudinal frame members 37 by moving the former from engagement with the stub bolts 48. It will thus be seen that the truck may be readily disassembled or knocked down in order that the same may be easily carried or transported as desired.

As mentioned above, the freight-receiving unit is provided with dovetailed channels or grooves 36 on the underside of the frame. These channels are arranged in two series which are spaced to correspond with the spacing of the longitudinal truck frame members 37, as clearly shown in Figs. 2 and 6 of the drawing. By means of this arrangement the truck may be run longitudinally into position under the raised freight-receiving unit, the longitudinal truck frame members slidably moving into engagement with the channels of the freight unit. In order to guide the truck in its engagement with the freight-carrying unit, the forward ends of the longitudinal truck frame members are preferably tapered as shown at 37'. The dovetailed shapes of the frame members and channels provide means whereby the truck is held securely in cooperative carrying relationship with the freight-carrying unit, and the latter may be safely moved as desired by means of the carrying unit. It will be obvious that the raising and lowering apparatus of the freight unit will be operated by means of the detachable cranking means above described to lower the unit and thus transfer the weight thereof with its load from the supporting screw rods 13 to the carrying truck. When the freight unit has been carried as desired the lifting means may again be operated to relieve the truck of its load, whereupon the latter may be withdrawn from its position beneath the unit. The detachable cranking mechanism can then be removed and the carrying unit disassembled or knocked down for storing or for transporting as desired, or it may be left in assembled relationship for cooperating with other freight-carrying units.

It is to be particularly noted that the freight unit receives the lading which may be suitably secured in position thereon by any desirable means. The freight unit thus forms a support which together with the freight may be conveniently packed for storing purposes or for shipping to a distant point in freight cars, ships or the like. Any desired number of these supports may be loaded into the carrying vehicle and carried to their destination, or they may be unloaded and moved away by means of the knock-down truck. It will thus be seen that the freight or merchandise is transported to its ultimate destination while packed on its freight-receiving unit and that piece handling of the freight is thus entirely avoided. This results in great saving of time and labor and also avoids breakage and other damage to the merchandise, since the latter is always handled in bulk. It will be obvious that the unit may be made in any suitable capacity, say, up to five tons if needed.

It is to be further noted that the freight-receiving unit may be constructed in any convenient form suitable for receiving various classes of freight, the form shown being illustrative merely. When the lifting means is in folded position and the operating means therefor detached, the freight unit is compact and neat having few projecting parts and occupying very little space in addition to the bulk of the freight. Whatever form the freight unit may assume, it is to be understood that it may be fitted with suitable raising and lowering means and it may also be constructed to cooperate detachably with the carrying truck described above.

In practice it will be desirable to employ any suitable number of duplicate freight receiving units which will be distributed where desired to receive their lading. Any desired number of trucks may also be employed, so that trucks and units may be used interchangeably, thus providing a very flexible system of handling all kinds of merchandise. The knock-down construction of the truck permits the same to be stored in small space, and it is easily transported from place to place by means of auto trucks or the like.

In the modification shown in Fig. 7 the threaded lifting rod 13 is protected by a casing surrounding the rod. This casing is made up of telescopic sections 50, the uppermost of which is attached to the freight-receiving unit and the lowermost to the supporting foot 20. This construction prevents dirt and foreign matter from coming into contact with the threaded rod and damaging or clogging the operating parts thereof.

As many changes could be made in the above construction 'and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent, is:—

1. In a freight handling apparatus, in combination, a merchandise receiving member adapted to form a shipping unit and having means mounted thereon for raising and lowering the same, and a knock-down carrying unit adapted to engage the freight unit in carrying relationship, said means being adapted to support said merchandise unit independently of said carrying unit.

2. In a freight handling apparatus, in combination, a merchandise receiving unit having a plurality of elements mounted thereon for raising or lowering the same, means for simultaneously operating said elements, and a carrying unit adapted to engage the freight unit in carrying relationship, said elements being adapted to support said merchandise unit independently of said carrying unit.

3. In a freight handling apparatus, in combination, a load receiving unit having means for raising and lowering the same, and longitudinally extending channels on the under side thereof, and a transporting unit having longitudinally extending engaging members adapted to slide into engaging relationship with said channels.

4. In a freight handling apparatus, in combination, a load receiving unit having means for raising and lowering the same, longitudinally extending channels on the under side thereof, a transporting unit having longitudinally extending engaging members adapted to slide into engaging relationship with said channels, and means for steering said transporting unit.

5. In a freight handling apparatus, in combination, a load receiving unit having means for raising and lowering the same, longitudinally extending channels on the under side thereof, a transporting unit having longitudinally extending engaging members adapted to slide into positively engaging relationship with said channels, and means for steering said transporting unit.

6. In a freight handling apparatus, in combination, a load receiving unit including a frame having timber pockets, transverse and longitudinal frame members engaging said pockets, and means for raising and lowering said unit, said means including threaded rods and nuts mounted in said pockets.

7. In a freight handling apparatus, in combination, a load receiving unit including a frame having timber pockets, transverse and longitudinal frame members engaging said pockets, means for raising and lowering said unit, said means including threaded rods and nuts mounted in said pockets, and means for simultaneously driving said nuts to raise or lower said unit.

8. In a freight handling apparatus, in combination, a load receiving unit including a frame having timber pockets, transverse and longitudinal frame members engaging said pockets, means for raising and lowering said unit, said means including threaded rods and nuts mounted in said pockets, and longitudinally extending channels on the under side of said unit, and a transporting truck for said unit having longitudinally extending engaging members for engaging said channels.

9. In a freight handling apparatus, in combination, a load receiving unit including a frame having timber pockets, transverse and longitudinal frame members engaging said pockets, means for raising and lowering said unit, said means including threaded rods and nuts mounted in said pockets, longitudinally extending channels on the under side of said unit, and a transporting truck for said unit having longitudinally extending engaging members for engaging said channels, wheels for said truck and unitary steering means for simultaneously moving all of said wheels.

10. In a freight handling apparatus, in combination, a load receiving unit including a frame having timber pockets at each corner and at points intermediate the ends thereof, transverse and longitudinal frame members engaging each of said timber pockets, and means for raising and lowering said unit, said means including a threaded rod and nut mounted in each of said timber pockets.

11. In a freight handling apparatus, in combination, a load receiving unit including a frame having timber pockets at each corner, and at points intermediate the ends thereof, transverse and longitudinal frame members engaging each of said timber pockets, and means for raising and lowering said unit, said means including threaded rods and sprocket nuts mounted in said frame, and a sprocket chain for simultaneously operating all of said nuts.

12. In a freight handling apparatus, in combination, a load receiving unit including a frame having timber pockets at each corner and at points intermediate the ends thereof, transverse and longitudinal frame members engaging each of said timber pockets, means for raising and lowering said unit, said means including a threaded rod and nut mounted in each of said timber pockets, and a truck for engaging said unit for transporting the latter.

13. In a freight handling apparatus, in combination, a load receiving unit including a frame having timber pockets at each corner and at points intermediate the ends thereof, transverse and longitudinal frame members engaging each of said timber pockets, and means for raising and lowering said unit, said means including threaded rods, sprocket nuts mounted in said frame and a sprocket chain for simultaneously operating all of said nuts, and a truck for engaging said unit for transporting the latter.

14. In a freight handling system, in combination, a merchandise receiving unit adapted for receiving merchandise and to be stored or moved from place to place therewith, a knock down carrying unit adapted to engage said merchandise unit in carrying relationship therewith, means independent of said carrying unit for supporting the merchandise unit whereby said units are associated in carrying relationship, and means for moving said supporting means to non-supporting position when said carrying unit is removed from carrying position.

15. In a freight handling apparatus, in combination, a load receiving unit, carrying means adapted to engage said unit in carrying relationship, means including a plurality of elements for raising and lowering said unit and adapted to support the same independently of said carrying means, and means for simultaneously operating said elements to raise or lower said unit.

In testimony whereof I affix my signature, in the presence of two witnesses.

JOHN J. SHEA, JR.

Witnesses:
H. M. SEAMANS,
CARL W. WEEKS.